(12) United States Patent
Elgendi

(10) Patent No.: US 12,443,029 B1
(45) Date of Patent: Oct. 14, 2025

(54) LIGHT AND/OR HEAT MANAGEMENT SYSTEM FOR A BUILDING, A BUILDING, AND A METHOD FOR LIGHT AND/OR HEAT MANAGEMENT IN A BUILDING

(71) Applicant: United Arab Emirates University, Al Ain (AE)

(72) Inventor: Mahmoud Elgendi, Al Ain (AE)

(73) Assignee: United Arab Emirates University (AE)

( * ) Notice: Subject to any disclaimer, the term of this patent is extended or adjusted under 35 U.S.C. 154(b) by 0 days.

(21) Appl. No.: 19/094,661

(22) Filed: Mar. 28, 2025

(51) Int. Cl.
    *G02B 26/02* (2006.01)
    *F24F 5/00* (2006.01)

(52) U.S. Cl.
    CPC ............ *G02B 26/02* (2013.01); *F24F 5/0075* (2013.01); *F24F 2005/0078* (2013.01); *F24F 2005/0082* (2013.01)

(58) Field of Classification Search
    CPC .............................. G02B 26/02; F24F 5/0075; F24F 2005/0078; F24F 2005/0082
    USPC ........................................................... 165/56
    See application file for complete search history.

(56) References Cited

U.S. PATENT DOCUMENTS

| | | | | |
|---|---|---|---|---|
| 2007/0277451 | A1* | 12/2007 | Yasui | A01G 9/1415 52/171.3 |
| 2011/0173903 | A1* | 7/2011 | Yasui | F21V 14/06 52/173.1 |
| 2021/0247077 | A1* | 8/2021 | Goldstein | E04F 13/007 |

FOREIGN PATENT DOCUMENTS

| | | |
|---|---|---|
| EP | 1864568 A1 | 12/2007 |
| EP | 2336633 A1 | 6/2011 |

* cited by examiner

*Primary Examiner* — Steve S Tanenbaum
(74) *Attorney, Agent, or Firm* — Knobbe, Martens, Olson & Bear, LLP

(57) ABSTRACT

The present disclosure relates to a light and/or heat management system for a building comprising a panel, wherein said panel comprises at least two transparent sheet layers disposed in a frame so as to form a gap interposed therebetween. The system further comprises a water supply system for supplying water into said gap, a humidification unit disposed in said gap configured to evaporate the water when said humidification unit is exposed to heat, such as solar radiation, such that the gap is filled with humid air whereby the transparency and heat transmissivity of said panel is decreased and a blower configured to controllably remove humid air from said gap, thereby controlling the heat transmissivity and/or transparency of the panel. The disclosure also relates to a building and a method for light and/or heat management in a building.

19 Claims, 3 Drawing Sheets

LIGHT AND/OR HEAT MANAGEMENT SYSTEM FOR A BUILDING, A BUILDING, AND A METHOD FOR LIGHT AND/OR HEAT MANAGEMENT IN A BUILDING

TECHNICAL FIELD

The disclosure generally relates to thermal and light management in buildings. In particular aspects, the disclosure relates to a light and/or heat management system and a building comprising such a system. Further, a method for light and/or heat management in a building is disclosed. The disclosure may be used for thermal and/or light management, e.g. due to incident solar radiation, in a variety of buildings, such as residential houses, or industrial buildings, such as greenhouses, etc.

BACKGROUND OF THE INVENTION

One of the primary challenges in modern architecture and construction is maintaining an optimal internal environment while minimizing energy consumption. Managing sunlight and heat that enters a building plays a crucial role in achieving energy efficiency, particularly in areas with extreme temperature fluctuations.

Traditional windows and glazing systems often fail to provide sufficient control over the amount of sunlight and heat that penetrates a building's interior. These systems can lead to excessive solar heat gain during hot weather or inadequate solar heat gain during cold weather, resulting in uncomfortable indoor temperatures and higher reliance on air conditioning or heating systems. This excessive reliance on HVAC (Heating, Ventilation, and Air Conditioning) systems can lead to increased energy consumption, higher utility costs, and greater environmental impact.

Another challenge in construction is the freshwater supply in buildings with as little environmental impact as possible, particularly in regions where freshwater is scarce and where saltwater, such as sea water is available.

Hence, there is a need for systems and methods which offer improved controllability of incident light and heat into a building. Further, there is a need for systems and methods for providing freshwater which can be easily integrated in buildings and require few additional components.

SUMMARY

According to a first aspect of the disclosure, there is provided a light and/or heat management system for a building comprising a panel, wherein the panel comprises at least two transparent sheet layers disposed in a frame so as to form a gap interposed therebetween. Further the system comprises a water supply system for supplying water into the gap. A humidification unit is disposed in the gap which is configured to evaporate the water when the humidification unit is exposed to heat, such as solar radiation. Hence, the gap becomes filled with humid air whereby the transparency and heat transmissivity of the panel is decreased. Further, the system comprises a blower configured to controllably remove humid air from the gap. Thereby the heat transmissivity and/or transparency of the panel can be controlled.

The first aspect of the disclosure may aim to provide efficient control of incident light and heat in a building. The water supply system and/or the blower may be controlled manually, e.g. by a person in the building thereby controlling the light and heat conditions in the building. Alternatively, the water supply system and/or the blower may be controlled by a computer system. The computer system may be fed with environmental data, such as sun radiation intensity, sun radiation direction or outside temperature. The data may also comprise weather forecasts. Further, data indicating light and/or temperature conditions in the building may be fed to the computer system. The computer system may be configured to determine a desired heat and/or light transmissivity based on the data. Accordingly, the computer system may control the water supply system and/or the blower based on the desired heat/light transmissivity. Hence, appropriate control of heat and/or light transmissivity into a building may be provided, thereby mitigating the need for other draperies or the like.

Optionally, the system further comprises a supply water control valve disposed in a fluid connection between the water supply system and the gap.

The flow of water towards the panel may be efficiently controlled by means of a supply water control valve.

Optionally, the water supply system is configured to supply saltwater into the gap.

Hence, the system is capable of desalinating saltwater by evaporation of salt water in the humidification unit.

Optionally, the blower is arranged to blow the humid air into a building, thereby humidifying the air in the building.

The blower may be configured to blow the humid air resulting from the evaporation of water in the gap into the building. Hence, the system may be capable of contributing to the air humidity inside the building, thereby controlling the air humidity in the building.

Optionally, the system further comprises a dehumidification unit arranged to receive the humid air from the blower and to separate water from the humid air, thereby generating freshwater.

Hence, additionally to the light and heat management capabilities, the system may be used to produce freshwater. The freshwater may be used in the building.

Optionally, the system further comprises a humid air control valve disposed in a fluid connection between the blower and the dehumidification unit.

Thereby, the flow of humid air may be controlled efficiently.

Optionally, the system further comprises a freshwater tank arranged to receive freshwater from the dehumidification unit.

Hence, collection of freshwater may be facilitated.

Optionally, the system further comprises a freshwater control valve disposed in a fluid connection between the dehumidification unit and the freshwater tank.

Hence, the flow of water from the dehumidification unit to the freshwater tank may be controlled.

Optionally, the blower is arranged to blow the humid air back to the water supply system. Hence, the water in the humid air is circulated back to the water supply system, where it may be condensed and again be provided to the water supply system. Hence, the water consumption of the light and/or heat management system may be decreased.

Optionally, the system comprises a humid air control valve disposed in a fluid connection between the blower and the water supply unit.

Hence, an efficient control of the amount of recirculated water may be achieved.

Optionally, the system comprises plants disposed in the humidification unit, the plants being grown in soil or hydroponically, thereby facilitating humidification of the air in the gap. Alternatively or additionally, the system may comprise an aquarium, a water fountain, a waterfall, means for producing a water spray or mist or any other means for enhancing evaporation of water.

Hence, an efficient evaporation of water in the gap may be achieved.

Optionally, the panel is a constructional element of a building, such as a ledge, a window, a facade, a curtain, or a windowsill.

Hence, efficient light and/or heat control into the building may be obtained.

According to a second aspect of the disclosure, there is provided a building comprising the light and/or heat management system according to the first aspect, wherein the panel system is used as a constructional element such as a ledge, a window, a facade, a curtain, or a windowsill.

The advantages and advantageous features of the second aspect are largely analogous to the advantages and advantageous features of the system according to the first aspect.

According to a third aspect, there is provided a method for light and/or heat management in a building. The method comprises supplying, by a water supply system, water into a gap of a panel formed by at least two transparent sheet layers disposed in a frame;

evaporating the water in a humidification unit disposed in the gap by exposing the humidification unit to heat, such as from sunlight, thereby producing humid air in the gap;

adjusting a heat transmissivity and/or transparency of the panel by controlling the humidity in the gap.

The advantages and advantageous features of the method according to the third aspect are largely analogous to the advantages and advantageous features of the system according to the first aspect.

Optionally, the method comprises:

supplying saltwater into the gap;

leading humid air from the gap to a dehumidification unit and extracting freshwater from the humid air in the dehumidification unit.

Optionally, adjusting a heat transmissivity and/or transparency of the panel comprises using a blower to control the humidity in the gap by controllably removing humid air from the gap.

Optionally, the method further comprises:

obtaining information indicative of an amount and/or a direction of incident solar radiation and/or a current indoor climate, such as an indoor temperature; and adjusting the heat transmissivity and/or transparency of the panel based on the information.

Optionally, the method further comprises:

leading air from the gap into a building, thereby humidifying the air in the building.

BRIEF DESCRIPTION OF THE DRAWINGS

With reference to the appended drawings, below follows a more detailed description of embodiments of the disclosure cited as examples.

In the drawings.

Figure 1:
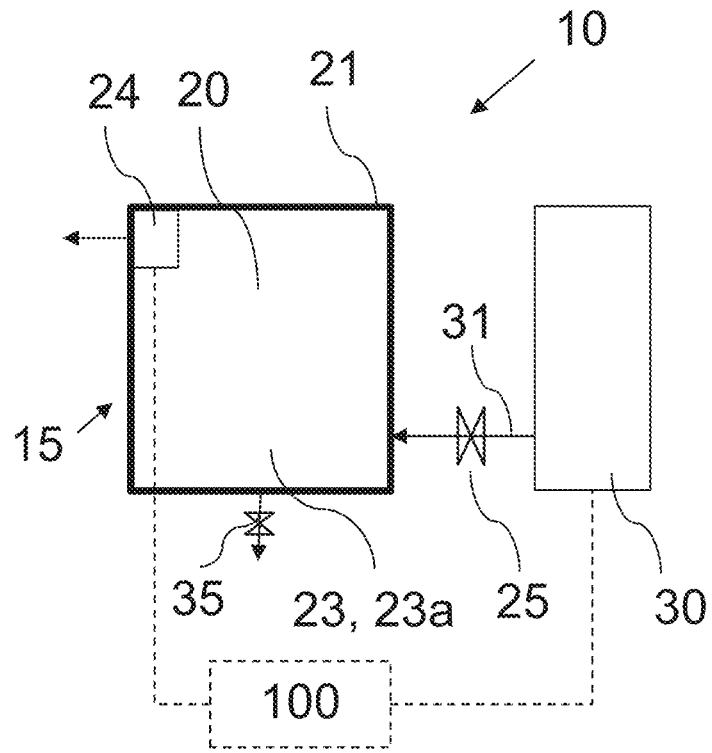
FIG. 1 shows an illustration of a light and/or heat management system according to an example.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise. Some of the reference characters in some of the drawings may have been omitted for the sake of clarity.

DETAILED DESCRIPTION OF PREFERRED EMBODIMENTS

The detailed description set forth below provides information and examples of the disclosed technology with sufficient detail to enable those skilled in the art to practice the disclosure.

An aim of the present disclosure is to alleviate at least one drawback of the prior art, or at least to provide a suitable alternative. In particular, an aim of the present disclosure may be to provide an efficient and convenient way of controlling incident light and/or heat into a building, e.g. through windows. The present disclosure may alleviate the need for curtains, draperies in the form of fabrics or the like, which are commonly installed for blocking heat and/or light into buildings. Some examples of the present disclosure may also aim for contributing to controlling the indoor air humidity in a building. Further, some examples may aim for a multifunctional system, also working as a desalination system, which produces freshwater from saltwater.

FIG. 1 shows a light and/or heat management system 10 according to an example of the present disclosure. The system comprises a panel 15 formed by at least two transparent sheets 23. The transparent sheets 23 may be made of glass or a transparent plastic. In principle, any transparent material which can be formed into sheets is conceivable. The transparent sheets 23 are held together at a distance by a frame 21. The frame may be formed of metal or wood or the like. Due to the distance between the transparent sheets 23, a gap 23*a* is formed. In the gap 23*a*, a humidification unit 20 is disposed. The humidification unit 20 may be configured to facilitate evaporation of water, thereby filling the gap 23*a* with humid air. The humidification unit may comprise plants, in particular hydroponics, to enhance the evaporation of water into the air. In some examples, the humidification unit 20 may comprise means for producing sprays or mists, such as ultrasonic vibrators, for facilitating the evaporation of water. Additionally or alternatively, the humidification unit 20 may comprise one or more aquariums, one or more water fountains and/or one or more waterfalls. In some examples, the humidification unit 20 may have an outlet with a valve 35 for drawing excess fluid from the humidification unit 20.

Further, the system 10 comprises a water supply system 30. The water supply system 30 may comprise a water tank or may be connected to a residential water supply network (not shown). The water supply system 30 may supply water into the gap 23*a* between the transparent sheets 23*a* via a fluid connection 31, such as a pipe. Inside the gap 23*a* the water may be evaporated when the panel 15 is exposed to heat, i.e. the air humidity in the gap 23*a* is increased. In some examples, the panel 15 may be arranged in or on a building 1 (see FIG. 4) in the form of a ledge, a window, a facade, a curtain, or a windowsill. Hence, the panel 15 may be exposed to sun light. The air and the water in the gap 23a may thus be heated. When the gap 23a is filled with humid air due to the evaporation of water, the transparency and the heat transmissivity of the panel may be decreased. This is due to the fact that the humid air inside the gap 23a absorbs both light and heat of incident sun light. Further, some of the incident heat is consumed by the evaporation process in the humidification unit 20. Hence, less light and/or heat will enter into the building 1.

The amount of water supplied into the gap 23a may be controlled by a supply water control valve 25. In some examples, the supply water control valve 25 may be controlled manually. Additionally or alternatively, the supply water control valve 25 may be controlled electronically, such as by a computer system 100. It is also conceivable that the water supply system 30 controls the amount of water supplied to the gap 23a by other means instead of the supply water control valve 25. For example, the water supply system 30 may comprise a pump, which may be controlled to supply water to the gap 23a at a desired flow rate.

Further, the system 10 comprises a blower 24, such as a fan, which is configured to remove humid air from the gap 23a at a controlled rate. Thereby, the light and/or heat transmissivity of the panel 15 may be controlled. When the blower 24 removes air form the gap 23a, fresh air is drawn into the gap 23a through a suitable air intake, preferably at the top of the panel 15. As with the water supply system 30, the blower 24 may also be controlled manually or by a computer system 100. The blower 24 may be arranged to blow the humid air into the building 1 and may thereby contribute or control the air humidity inside the building 1.

As intimated above, in some examples, the system may optionally comprise a computer system 100. The computer system 100 may be in communication with the water supply system 30 and the blower 24. The computer system 100 may be configured to receive data indicative of an indoor climate of the building 1 and of the weather conditions outside of the building 1. The data may include weather forecasts or current weather data. The data may comprise temperature data and/or air humidity data inside and/or outside of the building 1. Further, the data may comprise sun radiation intensity and direction. The data may be measured by appropriate sensors or be retrieved by third parties such as weather forecast services or the like.

Figure 2:
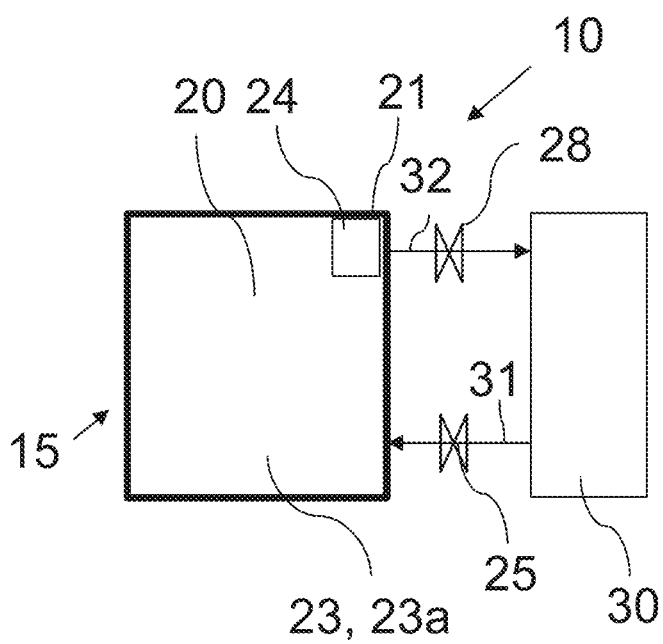
FIG. 2 shows an illustration of a light and/or heat management system according to another example.

FIG. 2 schematically shows a light and/or heat management system 10 according to another example. Here, the blower 24 is configured to blow humid air from the gap 23a in the panel 15 to the water supply system 30 via a fluid connection 32, such as a pipe. The water supply system 30 may then recover water from the humid air, e.g. by condensation.

Hence, at least a part of the water may be recirculated. The fluid connection 32 between the blower 24 and the water supply system 30 may comprise a humid air control valve 28 to further control the flow of humid air to the water supply system 30. The blower 24 and the valve 28 may be controlled manually or by the computer system 100, as explained above.

Figure 3:
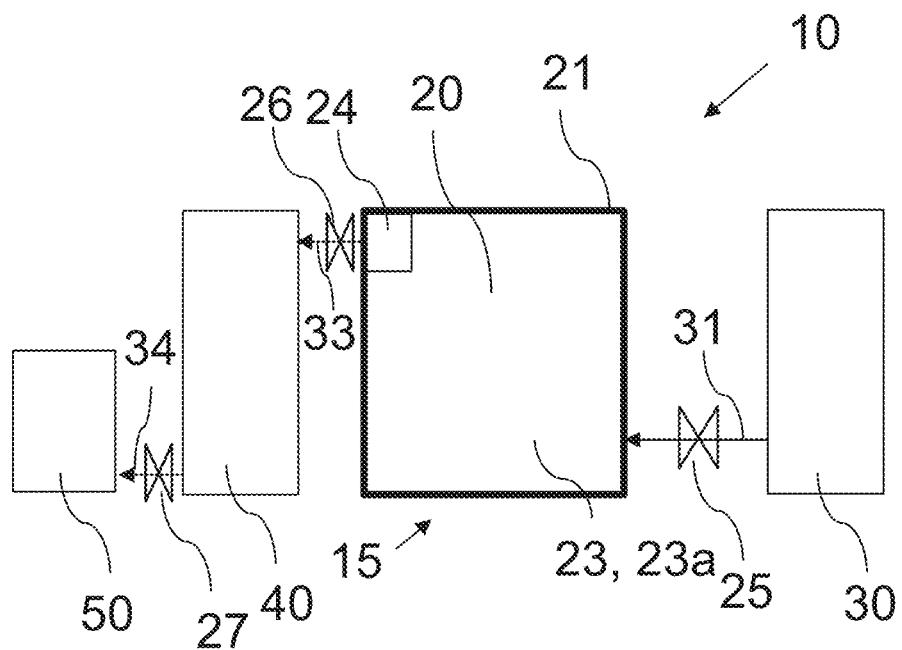
FIG. 3 shows an illustration of a light and/or heat management system according to another example.

FIG. 3 illustrates another example of a light and/or heat management system 10 according to the present disclosure. Here, the system 10 may comprise a dehumidification unit 40 which may be arranged to receive humid air from the blower 24 via a fluid connection 33. A humid air control valve 26 may be arranged between the blower 24 and the dehumidification unit 40. The dehumidification unit 40 may be arranged to separate water from the humid air and thereby produce freshwater, e.g. by condensation of water in the humid air at a cold surface or the like. Hence, the system 10 may be used for light and/or heat management of the building and at the same time for producing freshwater. For example, the water supplied to the water supply system 30 may be salt water, such as sea water. Hence, the light and/or heat management system 10 may be used to desalinate salt water and produce freshwater. The freshwater may be used in the building for different purposes, such as for providing drinking water or for watering plants.

Further, the system may comprise a freshwater tank 50 for collecting freshwater being configured to receive fresh water from the dehumidification unit 40 via a fluid connection 34. A freshwater control valve 27 may be arranged between the dehumidification unit 40 and the freshwater tank 50.

Figure 4:
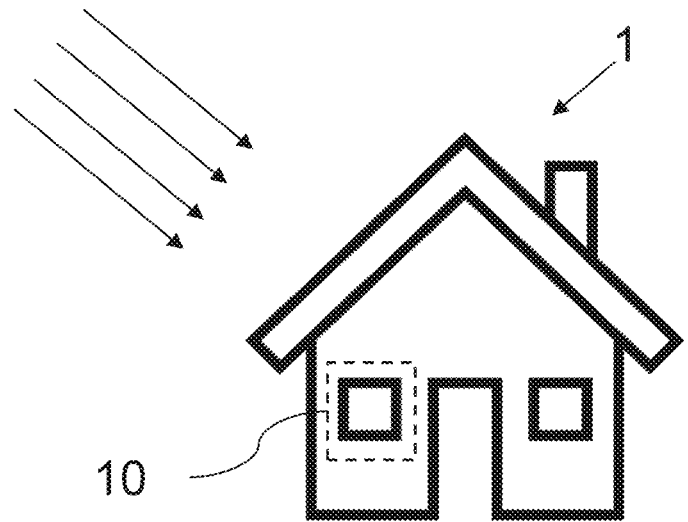
FIG. 4 schematically illustrates a building according to an example.

An application of the light and/or heat management system 10 in a building is exemplified in FIG. 4. FIG. 4 shows a building 1. The building may be exposed to solar radiation as illustrated by arrows in the figure. The building 1 comprises the system 10 in the sense that the panel 15 of the system 10 replaces or complements one or more windows of the building 1. However, as mentioned before, the panel may also be a ledge, a facade, a curtain, or a windowsill or any other external element of the building 1.

Figure 5:
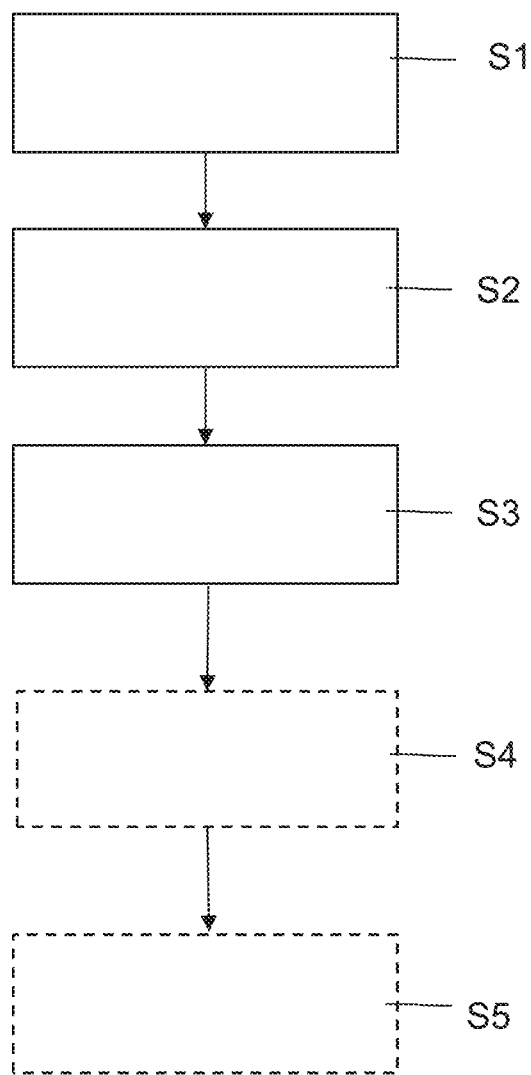
FIG. 5 is a flow-chart of a method according to an example.

With reference to FIG. 5, a method for light and/or heat management in a building is explained. The method comprises a number of steps illustrated as a flow-chart. Optional steps are marked by dashed lines.

Step S1: Supplying water into a gap 23a of a panel 15 formed by at least two transparent sheet layers 23 disposed in a frame 21.

In some examples, the supplied water may be saltwater or brine, such as seawater.

Step S2: Evaporating the supplied water in a humidification unit 20 disposed in the gap 23a by exposing the humidification unit 20 to heat, such as from sunlight, thereby producing humid air in the gap 23a.

The panel 15 may be part of a building, in particular as a facade, a curtain, or a windowsill. Hence, the panel 15 will be exposed to the outdoor climate conditions, in particular to sunlight. Since the panel 15 will be exposed to light and heat, e.g. from sunlight, the humidification unit 20 will also be exposed to heat. The humidification unit 20 may be configured to evaporate water and thereby produce humid air in the gap 23a.

Step S3: adjusting a heat transmissivity and/or transparency of the panel 15 by controlling the air humidity in the gap 23a.

The air humidity in the gap 23a may be controlled by the amount of water supplied to the humidification unit 20 and/or by controlling the amount of humid air being removed from the gap 23a, e.g. by a blower 24. The step S3 may comprise adjusting the heat transmissivity and/or transparency of the panel 15 based on information indicative of an amount and/or a direction of incident solar radiation and/or other outdoor weather conditions, such as outdoor temperature. Further, the heat transmissivity and/or the transparency may be adjusted based on a current indoor climate, such as an indoor temperature or indoor air humidity. Such information may be received by sensors and/or weather data from third party service providers.

Optionally, the method may comprise the steps S4 and S5:

Step S4: Leading humid air from the gap 23a to a dehumidification unit 40.

As explained above, the humid air may be removed from the gap 23a by a blower 24. The blower 24 may be controlled manually or electronically to remove an amount of humid air. Alternatively, the humid air may be led to the inside of the building, thereby contributing to the indoor air humidity of the building.

Step S5: Extracting freshwater from the humid air in the dehumidification unit 40. Freshwater may be extracted from the humid air, e.g. by condensation techniques. Hence, the method provides control of heat and/or light in the building and at the same time, produces freshwater. The freshwater may be collected in a water tank 50 and may be used for different purposes in the building, such as for providing drinking water.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A light and/or heat management system for a building comprising:
    a panel, wherein said panel comprises at least two transparent sheet layers disposed in a frame so as to form a gap interposed therebetween;
    a water supply system for supplying water into said gap;
    a humidification unit disposed in said gap configured to evaporate the water when said humidification unit is exposed to heat, such that the gap is filled with humid air whereby a transparency and a heat transmissivity of said panel is decreased; and
    a blower configured to controllably remove humid air from said gap, thereby controlling the heat transmissivity and/or transparency of the panel.

2. The system of claim 1, further comprising a supply water control valve disposed in a fluid connection between said water supply system and said gap.

3. The system of claim 1, wherein the water supply system is configured to supply saltwater into said gap.

4. The system of claim 1, wherein the blower is arranged to blow the humid air into a building, thereby humidifying the air in said building.

5. The system of claim 1, further comprising plants disposed in said humidification unit, the plants being grown in soil or hydroponically, thereby facilitating humidification of the air in said gap.

6. The system according to claim 1, further comprising an aquarium and/or a water fountain and/or a waterfall and/or means for producing a water spray or mist.

7. The system according to claim 1, wherein the panel is a constructional element of a building.

8. A building comprising the light and/or heat management system according to claim 1, wherein the panel system is used as a constructional element.

9. The system of claim 1, wherein the blower is arranged to blow said humid air back to the water supply system.

10. The system of claim 9, further comprising a humid air control valve disposed in a fluid connection between said blower and said water supply unit.

11. The system of claim 1, further comprising a dehumidification unit arranged to receive said humid air from said blower and to separate water from said humid air, thereby generating freshwater.

12. The system of claim 11 further comprising a humid air control valve disposed in a fluid connection between said blower and said dehumidification unit.

13. The system of claim 11, further comprising a freshwater tank arranged to receive freshwater from said dehumidification unit.

14. The system of claim 13, further comprising a freshwater control valve disposed in a fluid connection between said dehumidification unit and said freshwater tank.

15. A method for light and/or heat management in a building, the method comprising:
    supplying, by a water supply system, water into a gap of a panel formed by at least two transparent sheet layers disposed in a frame;
    evaporating said water in a humidification unit disposed in said gap by exposing said humidification unit to heat, thereby producing humid air in said gap; and
    adjusting a heat transmissivity and/or transparency of said panel by controlling the humidity in said gap,
    wherein adjusting a heat transmissivity and/or transparency of said panel comprises using a blower to controllably remove humid air from said gap and thereby control the humidity in said gap.

16. A method for light and/or heat management in a building, the method comprising:
    supplying, by a water supply system, water into a gap of a panel formed by at least two transparent sheet layers disposed in a frame, wherein supplying, by the water supply system, water into the gap comprises supplying saltwater into said gap;
    evaporating said water in a humidification unit disposed in said gap by exposing said humidification unit to heat, thereby producing humid air in said gap;
    adjusting a heat transmissivity and/or transparency of said panel by controlling the humidity in said gap,
    leading humid air from said gap to a dehumidification unit; and
    extracting freshwater from said humid air in said dehumidification unit.

17. A method for light and/or heat management in a building, the method comprising:
    supplying, by a water supply system, water into a gap of a panel formed by at least two transparent sheet layers disposed in a frame;
    evaporating said water in a humidification unit disposed in said gap by exposing said humidification unit to heat, thereby producing humid air in said gap;
    obtaining information indicative of an amount and/or a direction of incident solar radiation and/or a current indoor climate; and
    adjusting a heat transmissivity and/or transparency of said panel by controlling the humidity in said gap, wherein adjusting the heat transmissivity and/or transparency of said panel comprises adjusting the heat transmissivity and/or transparency of said panel based on said information.

18. The method of claim 15, further comprising:
    leading air from said gap into a building, thereby humidifying the air in said building.

19. The method of claim 15, further comprising:
    leading air from said gap back to the water supply system, where water is condensed from the humid air and reused.

* * * * *